(12) United States Patent
Wilson et al.

(10) Patent No.: US 12,345,898 B2
(45) Date of Patent: *Jul. 1, 2025

(54) LOW REFLECTANCE REMOVABLE LENS STACK

(71) Applicant: Laminated Film LLC, Las Vegas, NV (US)

(72) Inventors: Stephen S. Wilson, Las Vegas, NV (US); Bart E. Wilson, Las Vegas, NV (US)

(73) Assignee: LAMINATED FILM LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,493

(22) Filed: Feb. 21, 2025

(65) Prior Publication Data

US 2025/0189700 A1 Jun. 12, 2025

Related U.S. Application Data

(63) Continuation of application No. 18/919,412, filed on Oct. 17, 2024, now Pat. No. 12,259,566, which is a
(Continued)

(51) Int. Cl.
*G02B 3/02* (2006.01)
*G02B 1/04* (2006.01)

(52) U.S. Cl.
CPC .............. *G02B 3/02* (2013.01); *G02B 1/041* (2013.01)

(58) Field of Classification Search
CPC .................................. G02B 3/02; G02B 1/041
See application file for complete search history.

(56) References Cited

U.S. PATENT DOCUMENTS

| 17,744 A | 7/1857 | Lathbury |
| 192,075 A | 6/1877 | Lumbaed |

(Continued)

FOREIGN PATENT DOCUMENTS

| CA | 2952436 A1 | 12/2015 |
| CA | 2952436 C | 3/2021 |

(Continued)

OTHER PUBLICATIONS

Wiseman, Sr., United States Statutory Invention Registration No. H1023, published Mar. 3, 1992, 7 pages.
(Continued)

*Primary Examiner* — James C. Jones
(74) *Attorney, Agent, or Firm* — Stetina Garred Brucker & Newboles

(57) ABSTRACT

A removable lens stack includes a base layer and one or more removable lens layers. The base layer may include a substrate and moth eye coatings on first and second sides of the substrate. A first removable lens layer may include a substrate and an acrylic or fluoropolymer coating on a first side of the substrate and may be stacked on top of the base layer such that the second side of the substrate faces the first side of the substrate of the base layer. A second removable lens layer may include a substrate and an acrylic or fluoropolymer coating on a first side of the substrate and may be stacked on top of the first removable lens layer such that the second side of the substrate faces the first side of the substrate of the first removable lens layer. The acrylic or fluoropolymer coating may comprise a hard coat.

20 Claims, 5 Drawing Sheets

Related U.S. Application Data continuation of application No. 18/408,123, filed on Jan. 9, 2024, now Pat. No. 12,140,781, which is a continuation-in-part of application No. 18/315,394, filed on May 10, 2023, now Pat. No. 11,988,850, which is a continuation of application No. 18/167,673, filed on Feb. 10, 2023, now Pat. No. 11,709,296, which is a continuation-in-part of application No. 17/655,328, filed on Mar. 17, 2022, now Pat. No. 11,624,859, which is a continuation of application No. 17/386,304, filed on Jul. 27, 2021, now Pat. No. 11,307,329.

(56) References Cited

U.S. PATENT DOCUMENTS

| | | |
|---|---|---|
| 671,258 A | 4/1901 | Armstrong |
| 694,969 A | 3/1902 | Kemp |
| 781,507 A | 1/1905 | Powell |
| 781,508 A | 1/1905 | Fernow |
| 805,256 A | 11/1905 | Branch |
| 815,190 A | 3/1906 | Marchessault |
| 849,240 A | 4/1907 | Holman |
| 850,256 A | 4/1907 | Runge |
| 879,384 A | 2/1908 | Hillman |
| 882,182 A | 3/1908 | Thompson |
| 907,299 A | 12/1908 | Stroeh |
| 907,300 A | 12/1908 | Leggett et al. |
| 925,129 A | 6/1909 | Nicholson |
| 925,834 A | 6/1909 | Peck |
| 1,047,537 A | 12/1912 | Kiewicz |
| 1,337,036 A | 4/1920 | Bergman |
| 1,366,907 A | 2/1921 | Dunand |
| 1,471,415 A | 10/1923 | Platt |
| 1,517,791 A | 12/1924 | Mcandrew |
| 2,138,086 A | 11/1938 | Blodjer |
| 2,248,331 A | 7/1941 | Blodjer |
| 2,310,862 A | 2/1943 | Nessler |
| 2,328,687 A | 9/1943 | Serr |
| 2,339,280 A | 1/1944 | Madson |
| 2,354,415 A | 7/1944 | Woodard |
| 2,386,043 A | 10/1945 | Everett |
| 2,461,604 A | 2/1949 | Huntsman |
| 2,492,574 A | 12/1949 | Heintzelman |
| 2,511,329 A | 6/1950 | Craig |
| 2,546,117 A | 3/1951 | Lydia |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,052,678 A | 9/1962 | Ziegler et al. |
| 3,095,575 A | 7/1963 | Radov |
| 3,138,155 A | 6/1964 | Bould |
| 3,157,480 A | 11/1964 | Beukeri |
| 3,298,031 A | 1/1967 | Morgan |
| 3,475,766 A | 11/1969 | Raschke |
| 3,577,565 A | 5/1971 | Feldmann et al. |
| 3,605,115 A | 9/1971 | Bohner |
| 3,637,188 A | 1/1972 | Ung |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston, Jr. et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,314,537 A | 2/1982 | Asano et al. |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A | 3/1990 | Corbo et al. |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Westfield et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,054,480 A | 10/1991 | Bare et al. |
| 5,067,475 A | 11/1991 | Posnansky |
| 5,071,206 A | 12/1991 | Hood et al. |
| H0001023 H | 3/1992 | Wiseman |
| 5,104,929 A | 4/1992 | Bilkadi |
| 5,113,528 A | 5/1992 | Burke, Jr. et al. |
| 5,162,046 A | 11/1992 | Mercado |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |

(56) References Cited

U.S. PATENT DOCUMENTS

| | | |
|---|---|---|
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,468,247 A | 11/1995 | Matthai et al. |
| 5,471,036 A | 11/1995 | Sperbeck |
| 5,473,778 A | 12/1995 | Bell |
| 5,486,883 A | 1/1996 | Candido |
| 5,507,332 A | 4/1996 | Mckinnon |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay, Jr. |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,702,415 A | 12/1997 | Matthai et al. |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Lower et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,117,860 A | 9/2000 | Jennings-White et al. |
| 6,143,496 A | 11/2000 | Brown et al. |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,481,019 B2 | 11/2002 | Diaz et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| 6,622,311 B2 | 9/2003 | Diaz et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,745,396 B1 | 6/2004 | Landis et al. |
| 6,750,922 B1 | 6/2004 | Benning |
| 6,767,596 B2 | 7/2004 | Hayakawa et al. |
| 6,773,778 B2 | 8/2004 | Onozawa et al. |
| 6,773,816 B2 | 8/2004 | Tsutsumi |
| 6,777,055 B2 | 8/2004 | Janssen et al. |
| 6,800,378 B2 | 10/2004 | Hawa et al. |
| 6,838,610 B2 | 1/2005 | De Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,973,677 B2 | 12/2005 | Diaz et al. |
| 6,995,976 B2 | 2/2006 | Richardson |
| 7,021,456 B2 | 4/2006 | Haan et al. |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,597,441 B1 | 10/2009 | Farwig |
| 7,629,052 B2 | 12/2009 | Brumwell |
| 7,631,365 B1 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,735,156 B2 | 6/2010 | Vanderwoude et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B2 | 9/2011 | Davenport |
| 8,044,942 B1 | 10/2011 | Leonhard et al. |
| 8,101,277 B2 | 1/2012 | Logan et al. |
| 8,121,619 B1 | 2/2012 | Ghosh et al. |
| 8,234,722 B2 | 8/2012 | Vanderwoude et al. |
| 8,261,375 B1 | 9/2012 | Reaux |
| 8,282,234 B2 | 10/2012 | Vanderwoude et al. |
| 8,292,347 B1 | 10/2012 | Drake et al. |

(56) References Cited

U.S. PATENT DOCUMENTS

| | | |
|---|---|---|
| 8,294,843 B2 | 10/2012 | Hollaway |
| 8,316,470 B2 | 11/2012 | Mcneal et al. |
| 8,361,260 B2 | 1/2013 | Wilson et al. |
| 8,407,818 B2 | 4/2013 | Vanderwoude et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,819,869 B2 | 9/2014 | Vanderwoude et al. |
| 8,889,801 B2 | 11/2014 | Liao et al. |
| 8,918,198 B2 | 12/2014 | Atanasoff |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,173,437 B2 | 11/2015 | Vanderwoude et al. |
| 9,204,823 B2 | 12/2015 | Derenne et al. |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |
| 9,526,290 B2 | 12/2016 | Wilson |
| 9,575,231 B2 | 2/2017 | Chu et al. |
| 9,629,407 B2 | 4/2017 | Foster |
| 9,671,622 B1 | 6/2017 | Vetrini et al. |
| 9,706,808 B2 | 7/2017 | Sclafani et al. |
| 9,726,940 B2 | 8/2017 | Tomiyasu |
| 9,905,297 B2 | 2/2018 | Best |
| 9,968,155 B2 | 5/2018 | Wilson |
| 10,070,678 B2 | 9/2018 | Wilson |
| 10,165,819 B2 | 1/2019 | Klotz et al. |
| 10,167,765 B2 | 1/2019 | Kilbreath et al. |
| 10,201,207 B2 | 2/2019 | Vanderwoude et al. |
| 10,226,095 B2 | 3/2019 | Wilson |
| 10,227,501 B2 | 3/2019 | Hwang et al. |
| 10,321,731 B2 | 6/2019 | Wilson |
| 10,345,934 B2 | 7/2019 | Wilson et al. |
| 10,384,084 B2 | 8/2019 | Isham et al. |
| 10,427,385 B2 | 10/2019 | Wilson et al. |
| 10,449,397 B2 | 10/2019 | Vanderwoude et al. |
| 10,520,756 B2 | 12/2019 | Gallina et al. |
| 10,537,236 B2 | 1/2020 | Bennett et al. |
| 10,620,670 B2 | 4/2020 | Wilson et al. |
| 10,687,569 B1 | 6/2020 | Mcdirmid |
| 10,716,986 B2 | 7/2020 | Winter et al. |
| 10,871,661 B2 | 12/2020 | Saylor et al. |
| 10,874,163 B2 | 12/2020 | Vanderwoude et al. |
| 11,090,516 B2 | 8/2021 | Vanderwoude et al. |
| 11,141,959 B2 | 10/2021 | Wilson et al. |
| 11,147,323 B1 | 10/2021 | Wilson |
| 11,307,329 B1 * | 4/2022 | Wilson .................. G02B 1/041 |
| 11,480,801 B1 | 10/2022 | Morris et al. |
| 11,490,667 B1 | 11/2022 | Wilson et al. |
| 11,510,718 B2 | 11/2022 | Childers et al. |
| 11,548,356 B2 | 1/2023 | Wilson et al. |
| 11,579,339 B2 | 2/2023 | Thothadri et al. |
| 11,699,030 B1 | 7/2023 | Burd et al. |
| 11,709,296 B2 | 7/2023 | Wilson et al. |
| 11,723,420 B2 | 8/2023 | Wilson et al. |
| 11,807,078 B2 | 11/2023 | Wilson et al. |
| 11,912,001 B2 | 2/2024 | Wilson et al. |
| 11,988,850 B2 | 5/2024 | Wilson et al. |
| 12,077,037 B2 | 9/2024 | Wilson et al. |
| 12,162,330 B2 | 12/2024 | Wilson et al. |
| 12,259,566 B2 * | 3/2025 | Wilson .................. G02B 3/02 |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0071909 A1 | 4/2005 | Diaz et al. |
| 2005/0133035 A1 | 6/2005 | Yahiaoui et al. |
| 2005/0180877 A1 | 8/2005 | Usami et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0244595 A1 | 11/2005 | Hagen et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0000793 A1 | 1/2007 | Nelson |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0192351 A1 | 8/2008 | Miyagawa et al. |
| 2008/0231979 A1 | 9/2008 | Chen |
| 2008/0256688 A1 | 10/2008 | Bruce |
| 2008/0286500 A1 | 11/2008 | Sussner et al. |
| 2008/0292820 A1 | 11/2008 | Padiyath et al. |
| 2009/0008857 A1 | 1/2009 | Robinson et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0027992 A1 | 2/2010 | Harada et al. |
| 2010/0033442 A1 | 2/2010 | Kusuda et al. |
| 2010/0102197 A1 | 4/2010 | Mcintyre |

(56) References Cited

U.S. PATENT DOCUMENTS

| | | |
|---|---|---|
| 2010/0102476 A1 | 4/2010 | Higgins |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0001292 A1 | 1/2012 | Sasaki |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0149561 A1 | 6/2012 | Ribi et al. |
| 2012/0180204 A1 | 7/2012 | Hawkins |
| 2012/0183712 A1 | 7/2012 | Leonhard et al. |
| 2012/0183822 A1 | 7/2012 | Chung et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0083285 A1 | 4/2013 | Mcneal et al. |
| 2013/0089688 A1 | 4/2013 | Wilson et al. |
| 2013/0098543 A1 | 4/2013 | Reuter et al. |
| 2013/0141693 A1 | 6/2013 | Mccabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0032222 A1 | 1/2014 | Vetter et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2014/0289937 A1 | 10/2014 | Capers et al. |
| 2015/0009114 A1 | 1/2015 | Chen et al. |
| 2015/0033431 A1 | 2/2015 | Hofer Kraner et al. |
| 2015/0091425 A1 | 4/2015 | Rheault et al. |
| 2015/0093413 A1 | 4/2015 | Thess et al. |
| 2015/0103474 A1 | 4/2015 | Cho |
| 2015/0128896 A1 | 5/2015 | Cunningham et al. |
| 2015/0131047 A1 | 5/2015 | Saylor et al. |
| 2015/0195814 A1 | 7/2015 | Li et al. |
| 2015/0202847 A1 | 7/2015 | Johnson et al. |
| 2015/0234209 A1 | 8/2015 | Miyamoto et al. |
| 2015/0258715 A1 | 9/2015 | Ohta |
| 2015/0277196 A1 | 10/2015 | Nishimura et al. |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0193808 A1 | 7/2016 | Nishimura et al. |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0052286 A1 | 2/2017 | Hines et al. |
| 2017/0071792 A1 | 3/2017 | Wilson et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0192131 A1 | 7/2017 | Wilson et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0200329 A1 | 7/2018 | Shi et al. |
| 2018/0229480 A1 | 8/2018 | Chung |
| 2018/0236753 A1 | 8/2018 | Wykoff, II et al. |
| 2018/0295925 A1 | 10/2018 | Gagliardo et al. |
| 2018/0338550 A1 | 11/2018 | Boulware et al. |
| 2019/0006151 A1 | 1/2019 | Paukner et al. |
| 2019/0021430 A1 | 1/2019 | Elliott |
| 2019/0037948 A1 | 2/2019 | Romanski et al. |
| 2019/0055267 A1 | 2/2019 | Liu et al. |
| 2019/0116300 A1 | 4/2019 | Okuno |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2019/0346591 A1 | 11/2019 | Thothadri et al. |
| 2019/0389182 A1 | 12/2019 | Wilson et al. |
| 2020/0016245 A1 | 1/2020 | Rumbaugh et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0134773 A1 | 4/2020 | Pinter et al. |
| 2020/0154808 A1 | 5/2020 | Inouye |
| 2020/0178622 A1 | 6/2020 | Jascomb et al. |
| 2020/0247102 A1 | 8/2020 | Wilson et al. |
| 2020/0261055 A1 | 8/2020 | Zwierstra et al. |
| 2020/0281301 A1 | 9/2020 | Wynalda, Jr. |
| 2020/0310494 A1 | 10/2020 | Ahn et al. |
| 2020/0359718 A1 | 11/2020 | Jefferis et al. |
| 2020/0375272 A1 | 12/2020 | Ulmer et al. |
| 2020/0384747 A1 | 12/2020 | Fukuda et al. |
| 2021/0030095 A1 | 2/2021 | Reicher |
| 2021/0162645 A1 | 6/2021 | Wilson et al. |
| 2021/0176316 A1 | 6/2021 | Donahue et al. |
| 2021/0283994 A1 | 9/2021 | Wilson et al. |
| 2021/0298380 A1 | 9/2021 | Brown, II et al. |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2021/0393440 A1 | 12/2021 | Leatt et al. |
| 2021/0394427 A1 | 12/2021 | Frisco et al. |
| 2022/0015472 A1 | 1/2022 | Boza |
| 2023/0106407 A1 | 4/2023 | Arima et al. |
| 2024/0151881 A1* | 5/2024 | Wilson ............ G02B 1/041 |

FOREIGN PATENT DOCUMENTS

| | | | |
|---|---|---|---|
| EP | | 45 A1 | 12/1978 |
| EP | | 20501 A1 | 1/1981 |
| EP | | 20501 A4 | 2/1981 |
| EP | | 45 B1 | 10/1981 |
| JP | | 2002328613 A | 11/2002 |
| TW | | 201027992 A | 7/2010 |

(56) References Cited

FOREIGN PATENT DOCUMENTS

| | | |
|---|---|---|
| WO | 2004000540 A2 | 12/2003 |
| WO | 2015195814 A1 | 12/2015 |

OTHER PUBLICATIONS

PCT International Application No. PCT/US99/25128 with International Search Report, Date of Completion Jan. 18, 2000, 54 Pages.
Mos Nordion, "Gamma Compatible Materials," Datasheet, Aug. 2007, 4 pages, <https://ab-div-bdi-bl-blm.web.cern.ch/ Radiation/Gamma_Compatible_Materials_List_company.pdf>, retrieved on Sep. 29, 2021.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
www.wikipedia.org. "Black Body" , Jul. 2009, 11 pages.
www.wikipedia.org. "Infrared", Jul. 2009, 12 pages.
www.wikipedia.org. "Pet Film (biaxially oriented)", Jul. 2009, 4 pages.
Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/ content/articlelanding/2012/m/c2j m31005h#!div Abstract>.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.
Chemical Book, "Benzophenone", https://www.chemicalbook.com/Chemical ProductProperty_EN_CB57 44679.htm, available at least as of 2017, accessed on line on Dec. 15, 2021 (Year: 2017.
Chemical Book, "Polymethylhydrosiloxane", https://www.chemicalbook.com/Chemical ProductProperty _En_ C B3694969.htm, available at least as of 2017, accessed online on Dec. 15, 2021 (Year: 2017.
Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).
PCT International Search Report and Written Opinion for International Application No. PCT/US2017/044438, dated Oct. 23, 2017, 12 pages.
Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018.
PCT International Search Report and Written Opinion for International Application No. PCT/US20/24639, Jun. 11, 2020, 13 pages.
PCT International Search Report and Written Opinion for International Application No. PCT/US2020/024639; Jun. 11, 2020.
PCT International Search Report and Written Opinion for International Application No. PCT/US2020/049919; Nov. 27, 2020.
PCT International Search Report and Written Opinion for International Application No. PCT/US2020/062230; Feb. 8, 2021.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US2021/026165, dated Jul. 9, 2021, 10 pages.
PCT International Search Report and Written Opinion for International Application No. PCT/US21/20421, May 20, 2021, 8 pages.
Pearson Dental, "UV Protection Face Shields", https://www.pearsondental.com/catalog/subcat_thumb.asp?majcatid=750&catid=I0149, available online at least as of Jan. 27, 2021 per Internet Archive, accessed online on Sep. 15, 2021. (Year: 2021.
Patent Cooperation Treaty, International Search Report and Written Opinion for International Application No. PCT/US2022/031823, mailed Jul. 14, 2022, 11 pages.
Patent Cooperation Treaty, International Search Report and Written Opinion for International Application No. PCT/US2022/046171, mailed Jan. 18, 2023, 15 pages.
European Patent Office, Extended European Search Report for European Application No. 20863965.8, Aug. 21, 2023, 8 pages.
Patent Cooperation Treaty, International Search Report and Written Opinion for International Application No. PCT/US2023/012316, mailed Apr. 14, 2023, 11 pages.
Patent Cooperation Treaty, International Search Report and Written Opinion for International Application No. PCT/US2023/26598, mailed Sep. 12, 2023, 7 pages.
Canadian Intellectual Property Office, Office Action for Application No. 3,138,155, Dec. 19, 2024, 3 pages.
European Patent Office, Communication pursuant to Article 94(3) EPC, Nov. 14, 2024, 4 pages.
Patent Cooperation Treaty, International Search Report and Written Opinion for International Application No. PCT/US2024/052837, mailed Nov. 14, 2024, 6 pages.
State Intellectual Property Office, English translation of First Examination Opinion Notice for Chinese Application No. 202080071482.3, May 11, 2024, 22 pages.
State Intellectual Property Office, English translation of Second Examination Opinion Notice for Chinese Application No. 202080071482.3, Oct. 17, 2024, 18 pages.
Monitor Protection Device for a Flat Panel Display ", 11 pgs."
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
Dupont Teijin Films, "Mylar Polyester Film—Optical Properties", Jun. 2003, 2 pages.
International Search Report; International Application No. PCT/US03/16284; Date of Completion: Mar. 9, 2004; 3 pages.
www.store.moshimode.com; "iVisor AG for iPad 2 Black"; 2004-2010.
"Declaration of Jerome Aho"; Filed Aug. 3, 2007; Case 3:07-CV-00221-FDW-DCK; Includes: Exhibit A, Nascar Postcard (1 Page), Exhibit B, 50th Anniversary Nascar Letter Sent Jan. 7, 1998 (1 Page), and Exhibit C, Front Page Of "The Official Nascar Preview and Press Guide" 1 page); 9 pages.
https://en.wikipedia.org/wiki/black_body, "Black Body", Jul. 2009, 11 pages.
https://en.wikipedia.org/wiki/bopet, "PET Film (biaxially oriented)", Jul. 2009, 4 pages.
https://en.wikipedia.org/wiki/Infrared, "Infrared", Jul. 2009, 12 pages.
Jake Gaecke; "Appletell Reviews the iVisor for iPad"; www.appletell.com; Sep. 15, 2010 at 12:32 p.m. www.technologytell.com/apple/60407/appletell-reviews-ag-for-i pad/; 2 pages.
www.store.moshimonde.com; "iVisor AG iPad Screen Protector"; Jul. 2010; 7 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
Dictionary. com (http://dictionary.reference.com) 2012.
Defendant's Motion for Summary Judgment; Oct. 25, 2013; pp. 1-31.
PCT Search Report & Written Opinion for PCT/US2015/036248 (Sep. 16, 2015).
Hostaphan RBB, "Transparent, Temperature Stable Polyester Film for Cooking & Roasting Bags" Jul. 2016.

(56) References Cited

OTHER PUBLICATIONS

Hostaphan WIN, "White, Long-Term Stable, Thermally Stable Polyester Film for PV Back Sheet Laminates"; Jul. 2016.
*Racing Optics, Inc.* v. *Aevoe, Inc., d/b/a/ MOSHI*; Case No. 15-cv-017744-JCM-VCF; Aevoe's Initial Disclosure Non-Infringement, Invalidity and Unenforceability Contentions (Redacted) dated Jan. 7, 2016.
Saudi Basic Industries Corporation (SABIC); "The Department of Transportation [DOT] Guidebook"; Oct. 2016.
European Search Report for U.S. Appl. No. 15/809,930. 9-107 / 3157480 (Dec. 15, 2017).
Australian Examination Report for Application Serial No. 2015277196 (Oct. 18, 2018).
Canadian Office Action for Application Serial No. 2,952,436 (May 3, 2019).
Canadian Office Action for Application Serial No. 2,952,436 (Nov. 15, 2019).
PCT Search Report & Written Opinion for PCT/US2019/054565 (Dec. 20, 2019).
<https://www.opentip.com/product.php?products_id=11699030>, May 5, 2020, 3 pages.
Brim Shield, photographs, Apr. 21, 2020, 1 pages.
Eli N. Perencevich, Moving Personal Protective Equipment Into the Community Face Shields and Containment of COVID-19, Apr. 29, 2020, 2 pages.
Hatshield, Shield Yourself With The Hatshield <https://www.hat-shield.com/?gclid=CjwKCAjwp- XOBRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Instashield LLC, Bionic Wrench® Inventor Creates Low-Cost Face Shield For Masses, Apr. 15, 2020, 3 pages.
Leigh Buchanan, These 2 Companies Are Making Face Shields for Everyone <https://www.inc.com/leigh-buchanan/face-shields-coronavirus-protection-open-source. html>, May 6, 2020, 8 pages.
Tom Zillich, Surrey manufacturer hopes to hit home run with face shield that clips to baseball cap, Apr. 29, 2020, 3 pages.
F7e1-4b8b-9d02-4bd86f5158c5&pd rd wg=qkB2b&pf rd r=M%E2%80%A6>, May 6, 2020, 7 pages.
F7e1-4b8b-9d02-4bd86f5158c5&pd_rd_wg=pxuOs&pf_rd_r=PNDA%E2%80%A6>, May 5, 2020, 8 pages.
Invisible Gadget Guard, the Original "; 1 page".
Protect Your iPhone 4 with Screen Protectors from Incipo "; 3 pages".
What Makes NuShield Screen Protectors Superior ", 2 pages".
Something You Want "; 2 pages".
Apple iPad 2 (Wi-Fi 3G) Screen Protector "; 2 pages".
Exhibit 1006—Japanese Application No. JP 2002-328613 to Kitaguchi Translation; IPR2016-01745; at least as early as Sep. 7, 2016; pp. 1-10.
Ballato, John, Expert Report of John Ballato, Ph.D., Nov. 12, 2007, 5 pgs.
Ballato, John, Supplemental Expert Report of John Ballato, Ph.D., Nov. 19, 2007, 10 pgs.
Barnhardt, John J. III, Notice Pursuant to 35 U.S.C. 282, Dec. 18, 2007, 3 pgs.
Barnhardt, John J. III, Redacted Version Defendants' Memorandum in Support of Motion for Partial Summary Judgment, Dec. 3, 2007, 36 pgs.
Russell, Geoffrey A, Rebuttal Report of Geoffrey A Russell, Ph.D., on issues raised in the Export Report of John Ballato, Ph.D., Nov. 21, 2007, 15 pgs.

Professional Plastics (http://www.professionalplastics.com/MelinexPETFilmDupont) 2012.
Counterclaims—Jury Trial Demanded; Nov. 2, 2015; 15 pages.
Gregory Brower et al.; "Complaint for Patent Infringement"; Sep. 15, 2015; 15 pages.
Jeffrey A Silverstri et al.; "Answer to Complaint for Patent Infringement"; Oct. 7, 2015; 59 pages.
*Aevoe Corp* v. *Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
*Aevoe Corp.* v. *Racing Optics, Inc.*; Power of Attorney; Case IPR2016-01745; Inter Partes Review of U.S. Pat. No. 8,974,620; at least as early as Sep. 7, 2016; pp. 1-4.
Examiner's search strategy and results for U.S. Appl. No. 15/090,681; filed Aug. 21, 2016; 2 pages.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. 7,351,470 to Draheim et al.; Case IPR2016-01745; Inter Partes Review of U.S. Pat. No. 8,974,620; at least as early as Sep. 7, 2016; pp. 1-15.
Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Exhibit 1007—U.S. Appl. No. 13/838,311; Response to Office Action; Case IPR2016-01745; Inter Partes Review of.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
List of References considered by Examiner for U.S. Appl. No. 15/090,681; Receipt date Apr. 27, 2016; 4 pages.
List of References considered by Examiner for U.S. Appl. No. 15/090,681; Receipt date Jun. 30, 2016; 3 pages.
U.S. Pat. No. 8,974,620; at least as early as Sep. 7, 2016; pp. 1-32.
U.S. Pat. No. 8,974,620; at least as early as Sep. 7, 2016; pp. 1-55.
United States Patent and Trademark Office; Office Action for U.S. Appl. No. 15/090,681; filed Aug. 26, 2016; 8 pages.
United States Patent and Trademark Office; Office Action dated Dec. 21, 2016 pertaining to U.S. Appl. No. 15/090,681, filed Apr. 5, 2016; 8 pages.
Office Action for Canadian Patent Application No. 2,952,436; Jul. 8, 2020.
PCT Search Report and Written Opinion for US2020/016245 (Apr. 28, 2020).
Extended European search report for Application No. 22850034.4; mailed Apr. 7, 2025.

\* cited by examiner

LOW REFLECTANCE REMOVABLE LENS STACK

CROSS-REFERENCE TO RELATED APPLICATIONS

This application is a continuation of U.S. patent application Ser. No. 18/408,123, filed Jan. 9, 2024, which is a continuation-in-part of U.S. patent application Ser. No. 18/315,394, filed May 10, 2023, now U.S. Pat. No. 11,988,850 issued May 21, 2024, which is a continuation of U.S. patent application Ser. No. 18/167,673, filed Feb. 10, 2023, now U.S. Pat. No. 11,709,296, issued Jul. 25, 2023, which is a continuation-in-part of U.S. patent application Ser. No. 17/655,328, filed Mar. 17, 2022, now U.S. Pat. No. 11,624,859, issued Apr. 11, 2023, which is a continuation of U.S. patent application Ser. No. 17/386,304, filed Jul. 27, 2021, now U.S. Pat. No. 11,307,329, issued Apr. 19, 2022, the contents of each of which are expressly incorporated herein by reference.

STATEMENT RE: FEDERALLY SPONSORED RESEARCH/DEVELOPMENT

Not Applicable

BACKGROUND

In various environments where one uses protective eyewear such as goggles, visors, and face shields, it is important to maintain visibility as debris accumulates on the eyewear. For example, participants in off-road sports like motocross racing need to maintain visibility of the course as mud, bugs, and other debris accumulate on their goggles or helmet visor. Similarly, in an operating room environment, splatter can impair the view of surgeons or other operating personnel during a procedure. In response to these needs, tearoff films are commonly employed, either individually or in laminated stacks, which are applied to the goggle lens, visor, or face shield. As debris accumulates on the outermost tearoff film or the outermost tearoff film becomes damaged, the wearer simply tears it off to reveal the next pristine film underneath.

In order to ensure visual acuity through such stacked lenses, it is desirable to minimize internal reflection. One promising technology for reducing reflection is so-called moth-eye (ME) coatings, which simulate the anti-reflective properties of a moth's eye by providing a pattern of microscopic bumps that effectively eliminate the index of refraction interface between the lens and the air. Unfortunately, in the case of a stack of lenses, the adhesives used between the layers have a tendency to fill in around the bumps of the ME coating, drastically increasing the peel strength of each layer (making it 650 to 1,070 grams/inch, for example) and thus making the stack unusable as the layers cannot easily be torn off and the force to remove a layer may be greater than the tensile strength of the lens material.

BRIEF SUMMARY

The present disclosure contemplates various devices and methods for overcoming the drawbacks accompanying the related art. One aspect of the embodiments of the present disclosure is a removable lens stack. The removable lens stack may comprise a base layer including a substrate having a first side and a second side opposite the first side, the base layer further including a moth eye coating on the first side of the substrate. The removable lens stack may further comprise one or more removable lens layers, each removable lens layer including a substrate having a first side and a second side opposite the first side, a moth eye coating on the first side of the substrate, and a fluoropolymer coating on the second side of the substrate. The one or more removable lens layers may be stacked on top of the base layer such that the second side of the substrate of each removable lens layer faces the first side of the substrate of an immediately preceding layer from among the base layer and the one or more removable lens layers. Each of the fluoropolymer coatings may be molded to fit the moth eye coating of the immediately preceding layer.

In each of the one or more removable lens layers and the base layer, the moth eye coating may comprise a polymer.

In each of the one or more removable lens layers and the base layer, the moth eye coating may define a pattern of bumps with half-wave pitch.

In each of the one or more removable lens layers and the base layer, the moth eye coating may define a pattern of bumps with half-wave height.

In each of the one or more removable lens layers and the base layer, the moth eye coating may define a pattern of cones.

The base layer may further include a moth eye coating on the second side of the substrate.

In each of the one or more removable lens layers and the base layer, the substrate may comprise polyethylene terephthalate (PET).

The removable lens stack may comprise, in each of the one or more removable lens layers and the base layer, an adhesion treatment between the substrate and the moth eye coating. The adhesion treatment may comprise a pressure sensitive adhesive.

The removable lens stack may comprise, in each of the one or more removable lens layers, an adhesion treatment between the substrate and the fluoropolymer coating. The adhesion treatment may comprise a pressure sensitive adhesive.

A peel strength of each of the one or more removable lens layers may be less than 100 grams per inch. A peel strength of each of the one or more removable lens layers may be between 15 and 50 grams per inch and may, more particularly, be between 15 and 30 grams per inch.

A visible light transmission (VLT) of the removable lens stack may be greater than 95% and may, more particularly, be greater than 98%.

Another aspect of the embodiments of the present disclosure is a method of manufacturing a removable lens stack. The method may comprise providing a base layer including a substrate having a first side and a second side opposite the first side, the base layer further including a moth eye coating on the first side of the substrate. The method may further comprise stacking one or more removable lens layers on top of the base layer, each removable lens layer including a substrate having a first side and a second side opposite the first side, a moth eye coating on the first side of the substrate, and a fluoropolymer coating on the second side of the substrate. The one or more removable lens layers may be stacked on top of the base layer such that the second side of the substrate of each removable lens layer faces the first side of the substrate of an immediately preceding layer from among the base layer and the one or more removable lens layers. The method may further comprise laminating the stacked one or more removable lens layers to the base layer, each of the fluoropolymer coatings being molded to fit the moth eye coating of the immediately preceding layer.

The laminating may comprise laminating the stacked one or more removable lens layers to the base layer under pressure at a temperature less than 40° C.

The method may comprise, in each of the one or more removable lens layers, applying a corona treatment between the substrate and the moth eye coating.

The method may comprise, in each of the one or more removable lens layers, applying a corona treatment between the substrate and the fluoropolymer coating.

Another aspect of the embodiments of the present disclosure is a removable lens stack comprising a base layer, a first removable lens layer, and a second removable lens layer. The base layer may include a substrate and a moth eye coating on a first side of the substrate. The first removable lens layer may include a substrate, a single or multi-layer interference antireflective coating on a first side of the substrate, and a fluoropolymer coating on a second side of the substrate opposite the first side. The first removable lens layer may be stacked on top of the base layer such that the second side of the substrate of the first removable lens layer faces the first side of the substrate of the base layer, the fluoropolymer coating being molded to fit the moth eye coating. The second removable lens layer may include a substrate, a single or multi-layer interference antireflective coating on a first side of the substrate, and an acrylic or polyurethane adhesive on a second side of the substrate opposite the first side. The second removable lens layer may be stacked on top of the first removable lens layer such that the second side of the substrate of the second removable lens layer faces the first side of the substrate of the first removable lens layer.

The moth eye coating may comprise a polymer. The moth eye coating may define a pattern of bumps with half-wave pitch. The moth eye coating may define a pattern of bumps with half-wave height. The moth eye coating may define a pattern of cones.

The base layer may include a moth eye coating on a second side of the substrate opposite the first side.

In each of the base layer, the first removable lens layer, and the second removable lens layer, the substrate may comprise polyethylene terephthalate (PET).

The removable lens stack may further comprise a third removable lens layer including a substrate, a single or multi-layer interference antireflective coating on a first side of the substrate, and an acrylic or polyurethane adhesive on a second side of the substrate opposite the first side. The third removable lens layer may be stacked on top of the second removable lens layer such that the second side of the substrate of the third removable lens layer faces the first side of the substrate of the second removable lens layer. The removable lens stack may further comprise a fourth removable lens layer including a substrate, a single or multi-layer interference antireflective coating on a first side of the substrate, and an acrylic or polyurethane adhesive on a second side of the substrate opposite the first side. The fourth layer may be stacked on top of the third removable lens layer such that the second side of the substrate of the fourth removable lens layer faces the first side of the substrate of the third removable lens layer.

A peel strength of the first removable lens layer may be less than 100 grams per inch. The peel strength of the first removable lens layer may be between 15 and 50 grams per inch. The peel strength of the first removable lens layer may be between 15 and 30 grams per inch.

A visible light transmission (VLT) of the removable lens stack may be greater than 95%. The VLT of the removable lens stack may be greater than 98%.

Another aspect of the present disclosure is a method of manufacturing a removable lens stack. The method may comprise providing a base layer including a substrate and a moth eye coating on a first side of the substrate and stacking a first removable lens layer on top of the base layer, the first removable lens layer including a substrate, a single or multi-layer interference antireflective coating on a first side of the substrate, and a fluoropolymer coating on a second side of the substrate opposite the first side. The first removable lens layer may be stacked on top of the base layer such that the second side of the substrate of the first removable lens layer faces the first side of the substrate of the base layer. The method may further comprise laminating the stacked first removable lens layer to the base layer, the fluoropolymer coating being molded to fit the moth eye coating. The method may further comprise stacking a second removable lens layer on top of the first removable lens layer, the second removable lens layer including a substrate, a single or multi-layer interference antireflective coating on a first side of the substrate, and an acrylic or polyurethane adhesive on a second side of the substrate opposite the first side, the second removable lens layer being stacked on top of the first removable lens layer such that the second side of the substrate of the second removable lens layer faces the first side of the substrate of the first removable lens layer.

The laminating may comprise laminating the stacked first removable lens layer to the base layer under pressure at a temperature less than 40° C. The laminating may be performed prior to the stacking of the second removable lens layer on top of the first removable lens layer.

The method may further comprise applying a corona treatment between the substrate and the moth eye coating of the base layer and/or between the substrate and the fluoropolymer coating of the first removable lens layer.

The method may further comprise stacking a third removable lens layer on top of the second removable lens layer, the third removable lens layer including a substrate, a single or multi-layer interference antireflective coating on a first side of the substrate, and an acrylic or polyurethane adhesive on a second side of the substrate opposite the first side. The third removable lens layer may be stacked on top of the second removable lens layer such that the second side of the substrate of the third removable lens layer faces the first side of the substrate of the second removable lens layer. The method may further comprise stacking a fourth removable lens layer on top of the third removable lens layer, the fourth removable lens layer including a substrate, a single or multi-layer interference antireflective coating on a first side of the substrate, and an acrylic or polyurethane adhesive on a second side of the substrate opposite the first side. The fourth removable lens layer may be stacked on top of the third removable lens layer such that the second side of the substrate of the fourth removable lens layer faces the first side of the substrate of the third removable lens layer.

Another aspect of the embodiments of the present disclosure is a removable lens stack comprising a base layer, a first removable lens layer, and a second removable lens layer. The base layer may include a substrate, a moth eye coating on a first side of the substrate, and a moth eye coating on a second side of the substrate opposite the first side. The first removable lens layer may include a substrate and an acrylic coating on a first side of the substrate, the substrate having a second side opposite the first side, the first removable lens being stacked on top of the base layer such that the second side of the substrate of the first removable lens layer faces the first side of the substrate of the base layer. The second removable lens layer may include a substrate and an acrylic coating on a first side of the substrate, the substrate having a second side opposite the first side, the second removable lens layer being stacked on top of the first removable lens layer such that the second side of the substrate of the second removable lens layer faces the first side of the substrate of the first removable lens layer.

The acrylic coating of each of the first and second removable lens layers may comprise an acrylic hard coat. The acrylic hard coat may contain silica beads. The first removable lens layer may include a fluoropolymer coating on the second side of the substrate, the fluoropolymer coating being molded to fit the moth eye coating on the first side of the substrate of the base layer. The second removable lens layer may include an acrylic adhesive on the second side of the substrate. The second removable lens layer may include a polyurethane adhesive on the second side of the substrate.

Another aspect of the embodiments of the present disclosure is a removable lens stack comprising a base layer and a first removable lens layer. The base layer may include a substrate, a moth eye coating on a first side of the substrate, and a moth eye coating on a second side of the substrate opposite the first side. The first removable lens layer may include a substrate and an acrylic coating on a first side of the substrate, the substrate having a second side opposite the first side, the first removable lens layer being stacked on top of the base layer such that the second side of the substrate of the first removable lens layer faces the first side of the substrate of the base layer.

The acrylic coating may comprise an acrylic hard coat. The acrylic hard coat may contain silica beads. The first removable lens layer may include a fluoropolymer coating on the second side of the substrate, the fluoropolymer coating being molded to fit the moth eye coating on the first side of the substrate of the base layer. The removable lens stack may comprise a second removable lens layer including a substrate, an acrylic coating on a first side of the substrate, and an acrylic adhesive on a second side of the substrate opposite the first side, the second removable lens layer being stacked on top of the first removable lens layer such that the second side of the substrate of the second removable lens layer faces the first side of the substrate of the first removable lens layer. The removable lens stack may comprise a second removable lens layer including a substrate, an acrylic coating on a first side of the substrate, and a polyurethane adhesive on a second side of the substrate opposite the first side, the second removable lens layer being stacked on top of the first removable lens layer such that the second side of the substrate of the second removable lens layer faces the first side of the substrate of the first removable lens layer.

Another aspect of the embodiments of the present disclosure is a removable lens stack comprising a base layer and a first removable lens layer. The base layer may include a substrate, a moth eye coating on a first side of the substrate, and a moth eye coating on a second side of the substrate opposite the first side. The first removable lens layer may include a substrate and a fluoropolymer coating on a first side of the substrate, the substrate having a second side opposite the first side, the first removable lens layer being stacked on top of the base layer such that the second side of the substrate of the first removable lens layer faces the first side of the substrate of the base layer.

The fluoropolymer coating of the first removable lens layer may comprise a fluoropolymer hard coat. The fluoropolymer hard coat may contain silica beads. The first removable lens layer may include a fluoropolymer coating on the second side of the substrate, the fluoropolymer coating on the second side of the substrate of the first removable lens layer being molded to fit the moth eye coating on the first side of the substrate of the base layer. The removable lens stack may comprise a second removable lens layer including a substrate and a fluoropolymer coating on a first side of the substrate, the substrate having a second side opposite the first side, the second removable lens layer being stacked on top of the first removable lens layer such that the second side of the substrate of the second removable lens layer faces the first side of the substrate of the first removable lens layer. The second removable lens layer may include an acrylic adhesive on the second side of the substrate. The second removable lens layer may include a polyurethane adhesive on the second side of the substrate. The fluoropolymer coating of the second removable lens layer may comprise a fluoropolymer hard coat.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of removable lens stacks and manufacturing methods thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
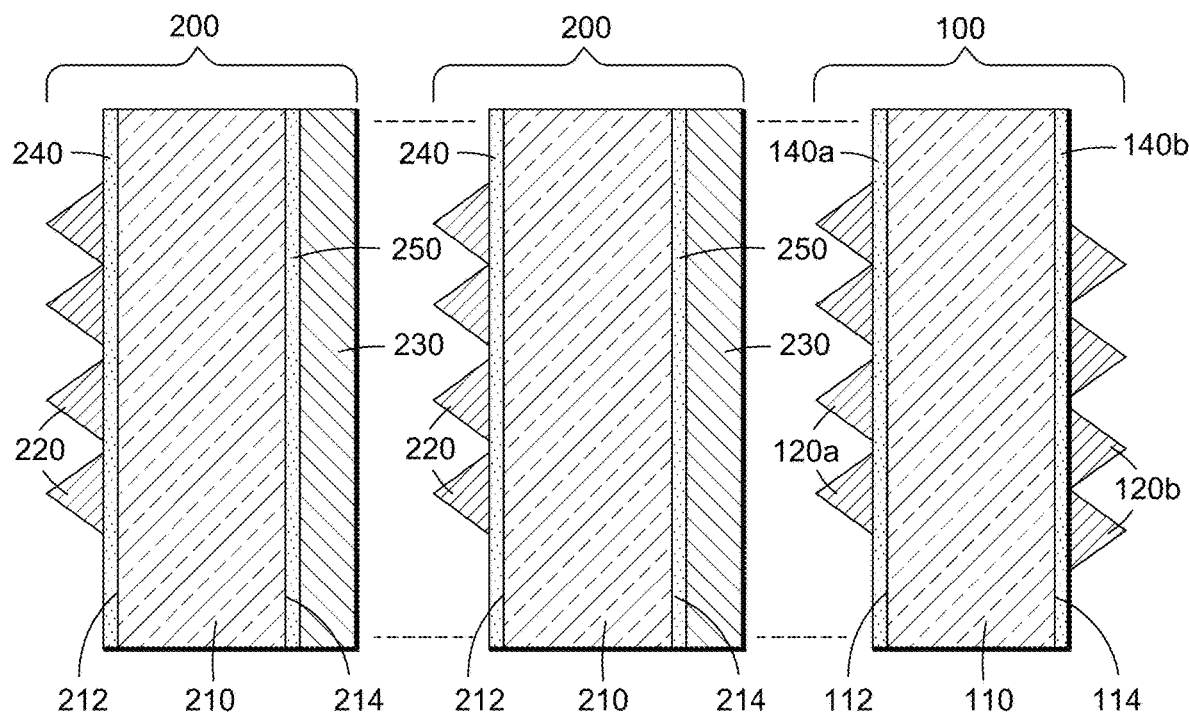
FIG. 1 is a cross-sectional view of a base layer and two removable lens layers of a removable lens stack according to an embodiment of the present disclosure.
Figure 2:
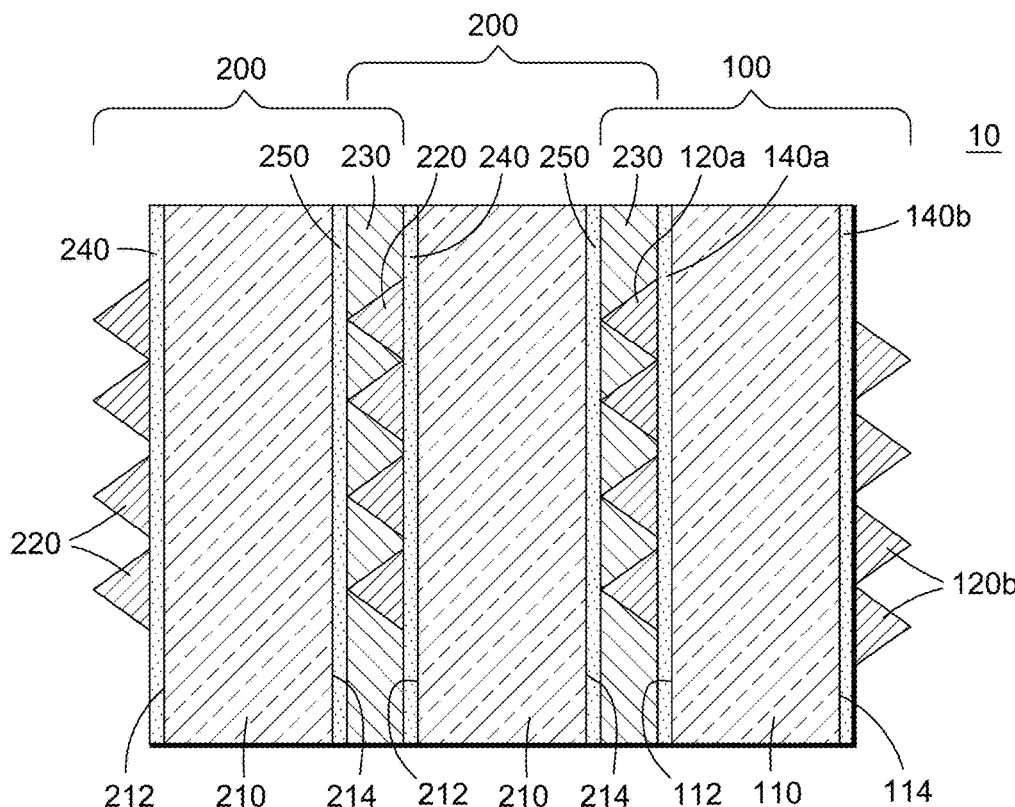
FIG. 2 is a cross-sectional view of the removable lens stack having the layers of FIG. 1.

FIG. 1 is a cross-sectional view of a base layer 100 and two removable lens layers 200, which may be stacked together to form a removable lens stack 10 as shown in cross-section in FIG. 2. The base layer 100 of the removable lens stack 10 may be affixed to a surface such as a goggle lens or visor or a transparent window of a surgical helmet, hood, or gown, for example, or alternatively may be attached at a perimeter thereof to a frame such that the removable lens stack 10 itself serves as the lens, visor, face shield, etc. (i.e.

without being affixed to a surface). In the example of FIGS. 1 and 2, two removable lens layers 200 are shown, which are stacked on the base layer 100 to form the removable lens stack 10. However, it is contemplated that there may be more than two removable lens layers 200 or that there may be only a single removable lens layer 200. As shown, each of the removable lens layers 200 may comprise a substrate 210 and a moth eye coating 220 on a first side 212 thereof. The base layer 100 may likewise comprise a substrate 110 and a moth eye coating 120a on a first side 112 thereof, as well as an optional moth eye coating 120b on a second side 114 opposite the first side 112. Owing to the moth eye coatings 120a, 120b, 220, the removable lens stack 10 may have very low reflectance and, accordingly, may exhibit a visible light transmission (VLT) of greater than 95% or in some cases greater than 98% (e.g. >99% with reflections sub 1%).

Unlike conventional removable lenses, each removable lens layer 200 may additionally comprise a fluoropolymer coating 230 on a second side 214 of the substrate 210 opposite the first side 212. As such, when the removable lens layer(s) 200 are stacked on top of the base layer 100 with the second side 214 of each substrate 210 facing the first side 112, 212 of the immediately preceding substrate 110, 210 (which may be the substrate 210 of an immediately preceding removable lens layer 200 or the substrate 110 of the base layer 100 as the case may be), the fluoropolymer coating(s) 230 may abut the moth eye coatings 120a, 220. Upon laminating the stacked removable lens layer(s) 200 to the base layer 100, each fluoropolymer coating 230 may thus be molded to fit the moth eye coating 120a, 220 of the immediately preceding layer 100, 200. The resulting mechanical interlocking of the moth eye coatings 120a, 220 with the molded female patterns corresponding thereto formed in the adjacent fluoropolymer coatings 230 may function similarly to a zipper to fix the adjacent layers together. Owing to this mechanical interlocking, the use of an acrylic or other tacky adhesive on the moth eye coating 120a, 220 may be entirely avoided, preventing the increased peel strength associated with such conventional adhesives collecting around the bumps of the moth eye coating 120a, 220. Thus, the removable lens layer(s) 200 may advantageously have a much lower peel strength, which may be less than 100 grams per inch and may, for example, be between 15 and 50 grams per inch or more particularly between 15 and 30 grams per inch (e.g. 25 grams per inch), making it possible for the wearer to remove each layer 200 as desired with a reasonable amount of pulling force. (It is noted that the use of a tacky adhesive to affix the base layer 100 to a surface may not present a problem since the base layer 100 need not be removable and thus an increased peel strength caused by buildup of adhesive around the bumps of the optional moth eye coating 120b may be acceptable.)

The substrate 110, 210 of each layer 100, 200 may comprise a transparent polymer such as polyethylene terephthalate (PET) and may be 1 to 10 mil thick, for example, around 2 mil thick for the substrate 210 of each removable lens layer 200 with the substrate 110 of the base layer 100 being the same thickness or typically thicker (e.g. 7 mil). The moth eye coating 220 of each of the removable lens layers 200, as well as the moth eye coating(s) 120a, 120b of the base layer 100, may comprise a polymer and may typically be made of a hard polymer such as glassy carbon having a Mohs hardness of 7, for example. The moth eye coating 120a, 120b, 220 may define a pattern of nano sized micro-projections or bumps (e.g. transparent cones) on the surface of the substrate 110, 210 with dimensions on the order of the wavelength of light (e.g. visible light), such as half-wave pitch and/or half-wave height, to produce the antireflective effect. For example, the pitch and/or height of the bumps may be 200-375 nm. Various shapes are possible for the bumps of the moth eye coating 120a, 120b, 220, including rounded or rectangular raised surfaces instead of cones, for example.

The moth eye coating 120a, 120b, 220 may be refractive index matched (e.g. to within 0.2) with the substrates 110, 210 and with the fluoropolymer coating(s) 230, as well as with any adhesives that may be used (as described below), such that the entire removable lens stack 10 may have a consistent index of refraction (e.g. within 0.2). However, because the refractive index interface between the air and the removable lens stack 10 may be effectively eliminated by the outermost moth eye coating 220 (as the interface appears like a gradient rather than a sudden change in material from the perspective of incident light), it is not necessary to index match the removable lens stack 10 to air (n=1). Therefore, it is contemplated that a wide variety of materials may be used for the substrates 110, 210 and other components of the removable lens stack 10.

In general, when building a conventional removable lens stack, a removable bonding material is used to wet each pair of adjacent surfaces together. The term "wetting," in this context, may refer to when two surfaces come in such close contact with each other that the contact displaces all of the air in between the two surfaces, allowing for good bonding. Whereas simply laying one lens on top of another lens does not disperse the air trapped between the lenses, an acrylic removable adhesive may be used to wet the surfaces together and promote bonding. By matching the refractive index of the adhesive with the refractive index(es) of the lenses (e.g. to within 0.2), visible light may stay at a constant speed at the interfaces, minimizing reflections. An example of such a system may be found in U.S. Pat. No. 9,295,297, entitled "Adhesive Mountable Stack of Removable Layers," the entire contents of which is expressly incorporated by reference herein. However, because adhesive is tacky to the touch, issues arise when bonding two surfaces together where one or both surfaces have a moth eye coating. In particular, as described above, the adhesive fills in around the micro-projections of the moth eye coating, drastically increasing the peel strength beyond what is functionally suitable for a removable lens stack.

Therefore, in order to wet the surfaces of the substrates 110, 210 together and achieve the preferred peel strength in the disclosed removable lens stack 10, the fluoropolymer coating(s) 230 may be provided on the second side 214 of each substrate 210. The fluoropolymer coating 230 may be an index-matched (e.g. to within 0.2) soft fluoropolymer such as fluorinated ethylene-propylene copolymer (FEP), perfluoroalkoxy alkane (PFA), or tetrafluoroethylene perfluoro(methyl vinyl ether) (MFA) that is not tacky to the touch but is moldable under laminating pressure to produce a debossed (female) pattern corresponding to the bumps of the abutting moth eye coating 120a, 220.

In some cases, an adhesion treatment 140a, 240 may be provided between the substrate 110 and moth eye coating 120a of the base layer 100 and/or between the substrate 210 and moth eye coating 220 of each removable lens layer 200. Likewise, if the substrate 110 of the base layer 100 further includes a moth eye coating 120b on the second side 114 thereof, an adhesion treatment 140b may be provided between the substrate 110 and the moth eye coating 120b. In each removable lens layer 200, an adhesion treatment 250 may similarly be provided between the substrate 210 and the fluoropolymer coating 230. The adhesion treatments 140a, 140b, 240, 250 may comprise a pressure sensitive adhesive such as a silicone adhesive (e.g. a polydimethyl/methylvinyl siloxane polymer and resin dispersed in toluene/isopropyl alcohol such as an adhesive sold under the name DOWSIL™ 7655 Adhesive or DOWSIL™ 7656 Adhesive by the Dow Chemical Company). The adhesive may be index matched (e.g. to within 0.2) with the substrates 110, 210 and other elements of the removable lens stack 10 as noted above.

The base layer 100 and one or more removable lens layers 200 may be manufactured by coating each substrate 110, 210 with the moth eye coating(s) 120a, 120b, 220 and fluoropolymer coating 230, which may in some cases be adhered to the substrates 110, 210 by adhesion treatments 140a, 140b, 240, 250 as described above. In order to improve adhesion, it is also contemplated that a corona treatment may be applied between the substrate 110, 210 and the moth eye coating 120a, 120b, 220, and/or between the substrate 210 and the fluoropolymer coating 220. This may ensure that the fluoropolymer coating 220 remains with the outermost removable lens layer 200 as it is pulled off the removable lens stack 10, for example. The corona treatment may be applied instead of or in addition to the above-described adhesion treatments 140a, 140b, 240, 250. The removable lens layer(s) 200 may then be stacked on top of the base layer 100 such that the second side 214 of the substrate 210 of each removable lens layer 200 faces the first side 112, 212 of the substrate 110, 210 of an immediately preceding layer from among the base layer 100 and the one or more removable lens layers 200 (as the case may be). In the illustrated example shown in FIGS. 1 and 2, a first removable lens layer 200 (shown in the center of each figure) is stacked on the base layer 100 and a second removable lens layer 200 (shown in the left-hand side of each figure) is stacked on the first removable lens layer 200. Additional removable lens layers 200 may similarly be provided and added to the stack.

The removable lens layer(s) 200 may then be laminated to the base layer 100 under pressure with or without heat, for example, under pressure at a temperature less than 40° C. It should be noted that the base layer 100 and removable lens layer(s) 200 may be laminated together in a single lamination process or in multiple lamination processes, for example, with each removable lens layer 200 added to the stack in a separate lamination process (or with multiple removable lens layers 200 being laminated together before being laminated to the base layer 100). As a result of the lamination, each fluoropolymer coating 230 may be molded to fit the moth eye coating 120a, 220 of the immediately preceding layer. In particular, the hard bumps of the moth eye coating 120a, 220 may press into the soft fluoropolymer coating 230 to produce the corresponding debossed (female) pattern in the fluoropolymer coating 230. In this way, the above-described mechanical interlocking between the layers 100, 200 may be achieved to produce the desired peel strength (e.g. 25 grams per inch) without the use of tacky adhesives between the layers 100, 200 that might otherwise fill in between the bumps and increase the peel strength too much. At the same time, the air between the layers 100, 200 may be expelled during the laminating process, allowing for wetting of the opposing layers 100, 200 (and slight adhesion as a result), while the refractive index interface may be effectively eliminated due to the index gradient created by the architecture of the moth eye coatings 120a, 220. The resulting visible light transmission (VLT) of the removable lens stack 10 may be greater than 95% (e.g. 96% with 4% reflection), as opposed to 92% with 8% reflection that might be found in an uncoated lens. In some cases, the VLT may be greater than 98% (e.g. >99%), especially when the moth eye coating 120b is provided so that there are moth eye coatings 120a, 120b, 220 on both sides of the stack 10.

When the removable lens stack 10 is incorporated into eyewear and being worn, the wearer may easily peel off the outermost removable lens layer 200 to reveal an unblemished removable lens layer 200 (or the base layer 100) underneath. In the case of a removable lens stack 10 having multiple removable lens layers 200, the pulling force used to remove the outermost removable lens layer 200 may generally involve an initial outward force (perpendicular to the stack 10) as the wearer lifts the outermost removable lens layer 200 off the stack 10 on one side to separate it from the other removable lens layers 200 (e.g. by grasping an easily accessible tab on one side of the stack 10), followed by a continuous sideways force (with a component parallel to the stack 10) as the wearer peels the outermost removable lens layer 200 off. It is contemplated that the continuous sideways force that is responsible for the majority of the separation of the removable lens layers 200 may have more of a tendency to lift off the outermost removable lens layer 200 than to separate subsequent layers 200 underneath. Therefore, the wearer can readily peel off one layer 200 at a time without accidentally tearing off additional layers 200 of the removable lens stack 10.

Figure 3:
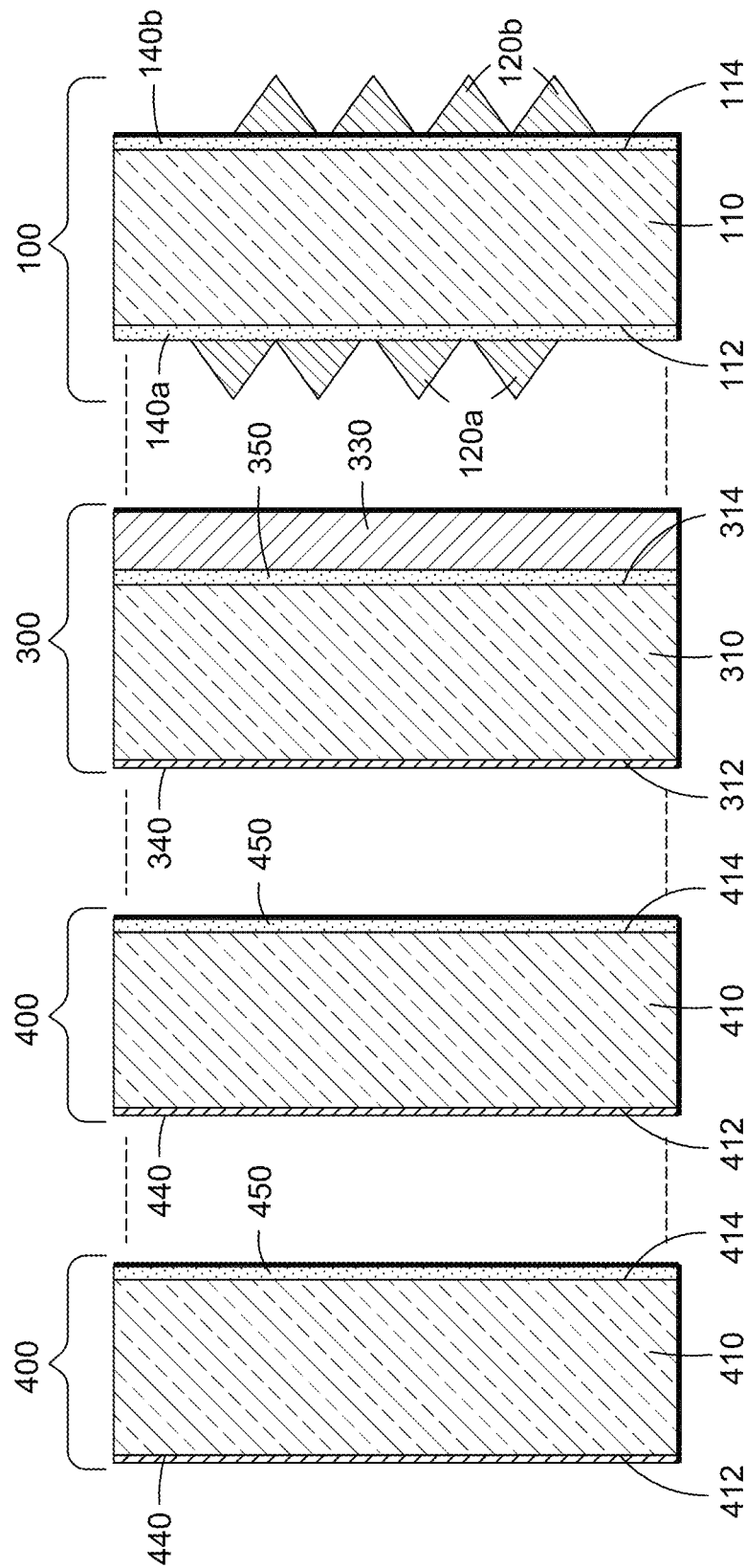
FIG. 3 is a cross-sectional view of a base layer and removable lens layers of a removable lens stack according to another embodiment of the present disclosure.

Hybrid stacks are also contemplated, in which one or more layers having moth eye coatings may be combined with one or more layers having alternative types of antireflective coatings such as single or multi-layer interference antireflective coatings. By way of example, FIG. 3 is a cross-sectional view of the same base layer 100 as in FIG. 1 but this time with a removable lens layer 300 and two removable lens layers 400, which may be stacked together to form a removable lens stack 20 as shown in cross-section in FIG. 4. The base layer 100 of the removable lens stack 20 may be the same as that of the removable lens stack 10 as shown in FIGS. 1 and 2 and may similarly be affixed to a surface such as a goggle lens or visor or a transparent window of a surgical helmet, hood, or gown, for example, or alternatively may be attached at a perimeter thereof to a frame such that the removable lens stack 20 itself serves as the lens, visor, face shield, etc. Advantageously, the removable lens stack 20 employs moth eye coating in some but not all layers, reducing the difficulty and expense associated with producing moth eye coating. In the illustrated embodiment, for example, the base layer 100 is the only layer to have moth eye coating, with removable lens layers 300, 400 instead having single or multi-layer interference antireflective coatings 340, 440 that may be less expensive to produce (e.g., by spin coating, dip coating, or vacuum deposition). In particular, a first removable lens layer 300 may include a substrate 310, a single or multi-layer interference antireflective coating 340 on a first side 312 of the substrate 310, and a fluoropolymer coating 330 on a second side 314 of the substrate 310 opposite the first side 312 (with optional adhesion treatment 350). With the first removable lens layer 300 stacked on top of the base layer 100 and the second side 314 of the substrate 310 facing the first side 112 of the substrate 110 of the base layer 100, the fluoropolymer coating 330 may be molded to fit the moth eye coating 120a as described above.

One or more additional removable lens layers 400 may also be added to the stack, each including a substrate 410, a single or multi-layer interference antireflective coating 440 on a first side 412, and an adhesive 450 such as an acrylic or polyurethane adhesive on a second side 414. One such removable lens layer 400 may be stacked on the removable lens layer 300 such that the second side 414 of the substrate 410 faces the first side 312 of the substrate 300. Further removable lens layers 400 may be stacked thereon, with the second side 414 of each substrate 410 facing the first side 412 of each preceding substrate 400. By using an antireflective coating 340, 440 that does not have bumps like the moth eye coating 120a, any concern about the adhesive 450 filling in around the bumps and undesirably increasing the peel strength can be avoided. As a result, various kinds of adhesive 450 may be used including an acrylic or polyurethane adhesive such as a pressure sensitive adhesive (PSA), which may adhere (e.g., with the application of pressure) to the antireflective coating 340, 440 of the preceding layer 300, 400. The hybrid removable lens stack 20 may effectively achieve the superior antireflective properties of moth eye by incorporating it in one or more layers while at the same time benefiting from one or more layers having less expensive antireflective coatings 340, 440 and/or adhesives 450. The hybrid removable lens stack 20 may thus represent a "best of both worlds" compromise that balances the need for a high degree of antireflection with the manufacturing costs.

Figure 4:
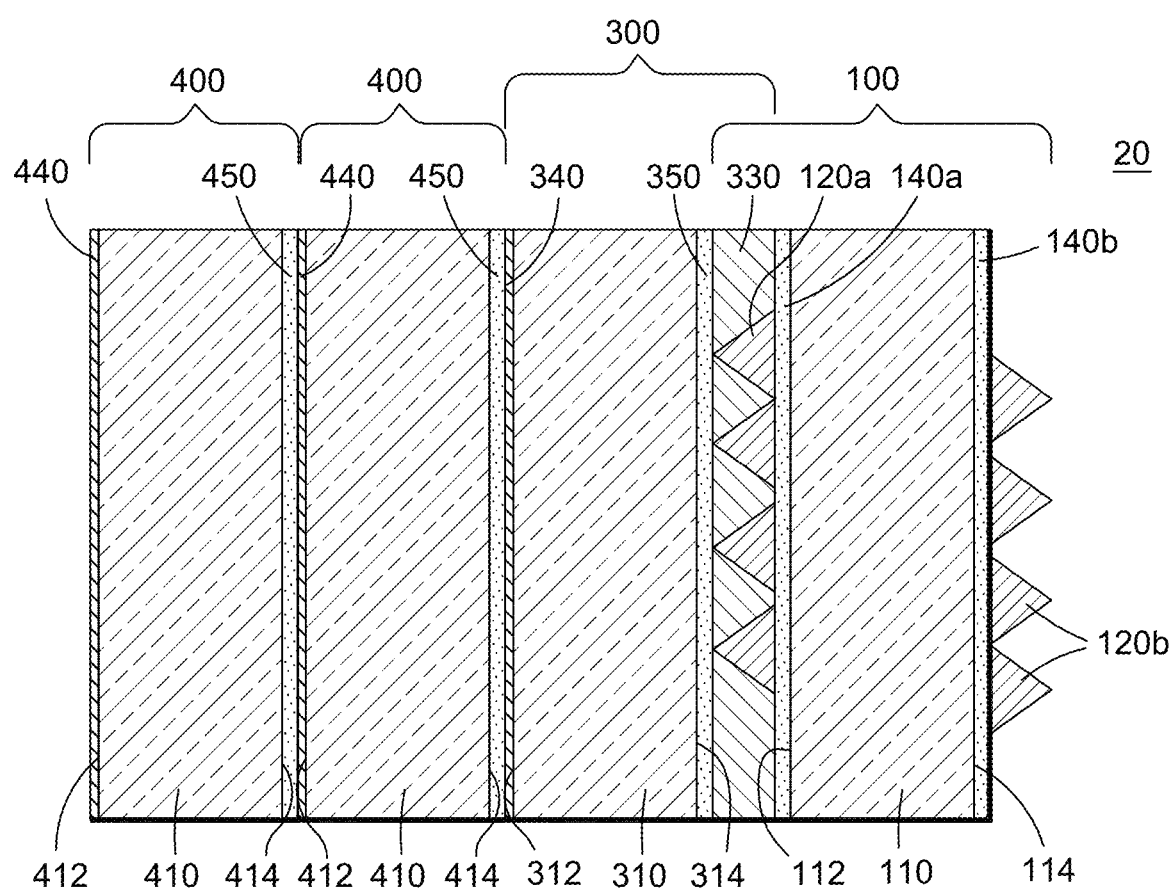
FIG. 4 is a cross-sectional view of the removable lens stack having the layers of FIG. 3.

In the example of FIGS. 3 and 4, one removable lens layer 300 (having a non-ME AR coating 340 and a fluoropolymer coating 330 to interface with the moth eye coating 120a of the base layer 100) and two removable lens layers 400 (having a non-ME AR coating 440 and an acrylic or polyurethane adhesive 450) are shown, which are stacked on the base layer 100 to form the removable lens stack 20. However, hybrid stacks of various other combinations of layers are also contemplated. For example, more or fewer removable lens layers 400 may be used. Also, one or more removable lens layers 200 (see FIGS. 1 and 2) may be added between the base layer 100 and the removable lens layer 300, In this case, the fluoropolymer coating 330 of the removable lens layer 300 may interface with the moth eye coating 220 of the outermost removable lens layer 200 instead of directly with the moth eye coating 120a of the base layer 100. Alternatively, substrates with moth eye coating(s) may be incorporated farther outward in the stack with one or more substrates having non-ME AR coating(s) underneath. To this end a modified layer 400 may be used having a moth eye coating in place of the non-ME AR coating 440 (but with the acrylic or polyurethane adhesive 450 still being used to interface with a non-ME AR coating underneath). Hybrid removable lens stacks 20 of various configurations may be economically designed and produced in accordance with the particular needs of the manufacturer and consumer, both in terms of the degree of antireflection required and the desired unit cost.

It should also be noted that the use of moth eye coatings on both sides of a single layer (i.e., forward and rear facing moth-eye patterns) is not necessarily limited to the base layer 100. Either of the removable lens stacks 10, 20 may include such double-sided moth-eye layers at any position in the stack. For example, the stack may consist of multiple layers 100 stacked on top of each other (which may in some cases be the only type of layer in the stack such as a stack consisting of three layers 100). Between each pair of adjacent layers 100, a fluoropolymer coating may be applied that may mold to the shape of the moth-eye coating as described above, except that in this case the fluoropolymer coating may mold to the shapes of two moth-eye coatings that face each other with the fluoropolymer coating therebetween. As one example method of stacking multiple such double-sided moth-eye layers 100, the fluoropolymer coating may be coated on the forward-facing moth-eye coating 120a of a first layer 100, causing one side of the fluoropolymer coating to mold to the shape of the forward-facing moth-eye coating 120a, and then a second layer 100 may be stacked on the fluoropolymer coating and laminated, causing the other side of the fluoropolymer coating to mold to the shape of the rear-facing moth-eye coating 120b of the second layer 100. Stacking of further layers 100 can continue in the same way (or in combination with other types of layers as described above), with the fluoropolymer coating being molded to the shapes of two adjacent moth-eye coatings wherever necessary. Preferably, a release treatment may be applied to each forward-facing moth-eye coating 120a, and/or an adhesion promoting treatment may be applied to each rear-facing moth-eye coating 120b, thus encouraging the fluoropolymer coating to come off with each layer 100 as it is removed from the stack. By using double-sided moth-eye layers in this way, a high degree of antireflection can be achieved. Moreover, depending on the moth-eye fabrication processes used, producing two moth-eye coatings 120a, 120b on the same substrate 110 may be more cost effective than producing individual moth-eye coatings on separate substrates, making the use of double-sided moth-eye layers potentially more efficient. Manufacturing processes may also be simplified (and costs reduced) by the use of the same repeated layer 100 in place of multiple different layers.

Given the very low reflectance that may be achievable using a base layer 100 having a forward-facing moth-eye coating 120a and/or a rear-facing moth-eye coating 120b, it is contemplated that a stack having an acceptable degree of antireflection may be achieved without necessarily requiring moth-eye or single or multi-layer interference anti-reflective coatings on the removable layers. In particular, it has been found that an acrylic coating, such as an acrylic coating of a hard coat applied to a PET substrate, may increase the smoothness of the outer surface of the substrate (which may have been roughened during production for ease of handling), thus lowering haze, while the lower refractive index of the acrylic coating in comparison to the PET substrate reduces reflection making the stack more anti-reflective. It has similarly been found that a fluoropolymer coating (e.g., silicone or Teflon), such as a fluoropolymer coating of a hard coat applied to a PET substrate, may likewise increase the smoothness of the outer surface and lower haze while similarly making the stack more anti-reflective due to the difference in refractive index. In combination with moth-eye coating(s) 120a, 120b on a base layer 100, such a stack including acrylic or fluoropolymer coatings on the removable layers may strike a balance between quality and cost-effectiveness. In addition, the acrylic or fluoropolymer coating may advantageously comprise an acrylic or fluoropolymer hard coat, which may contain silica beads, for example. In this way, the contemplated coatings may provide the functionality of a hard coat (e.g., increased scratch resistance) in addition to providing the anti-reflective effect.

Figure 5:
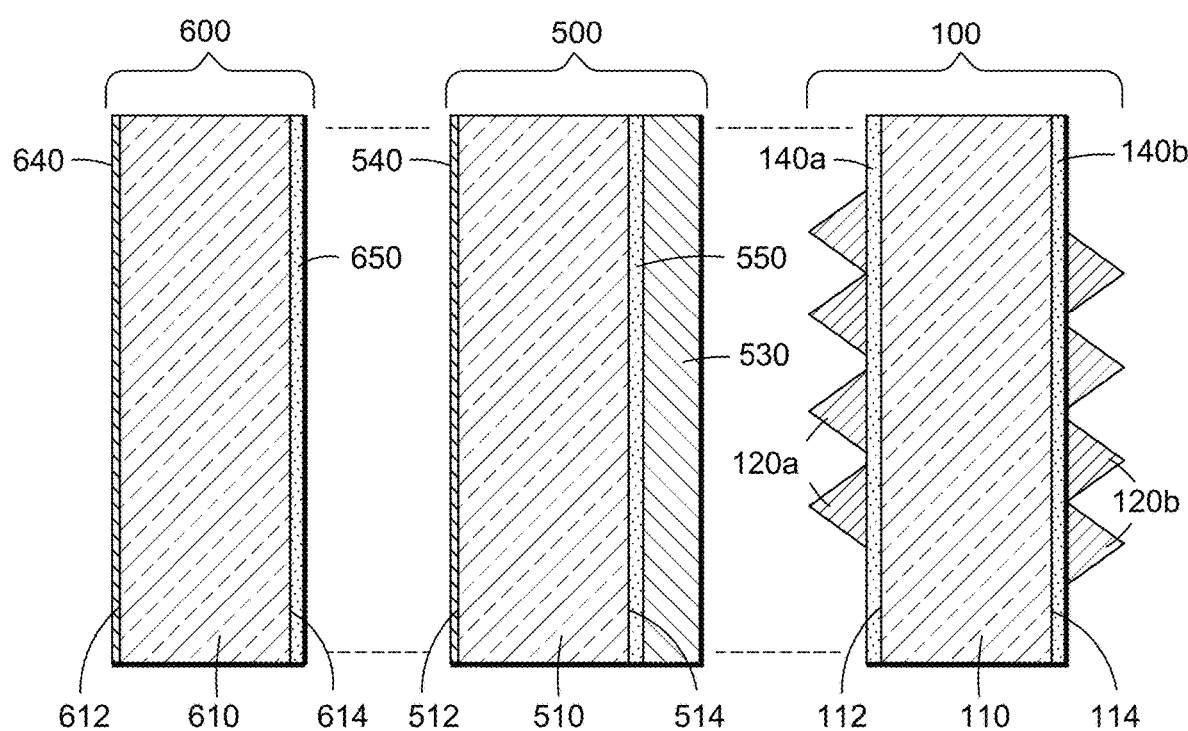
FIG. 5 is a cross-sectional view of a base layer and removable lens layers of a removable lens stack according to another embodiment of the present disclosure.
Figure 6:
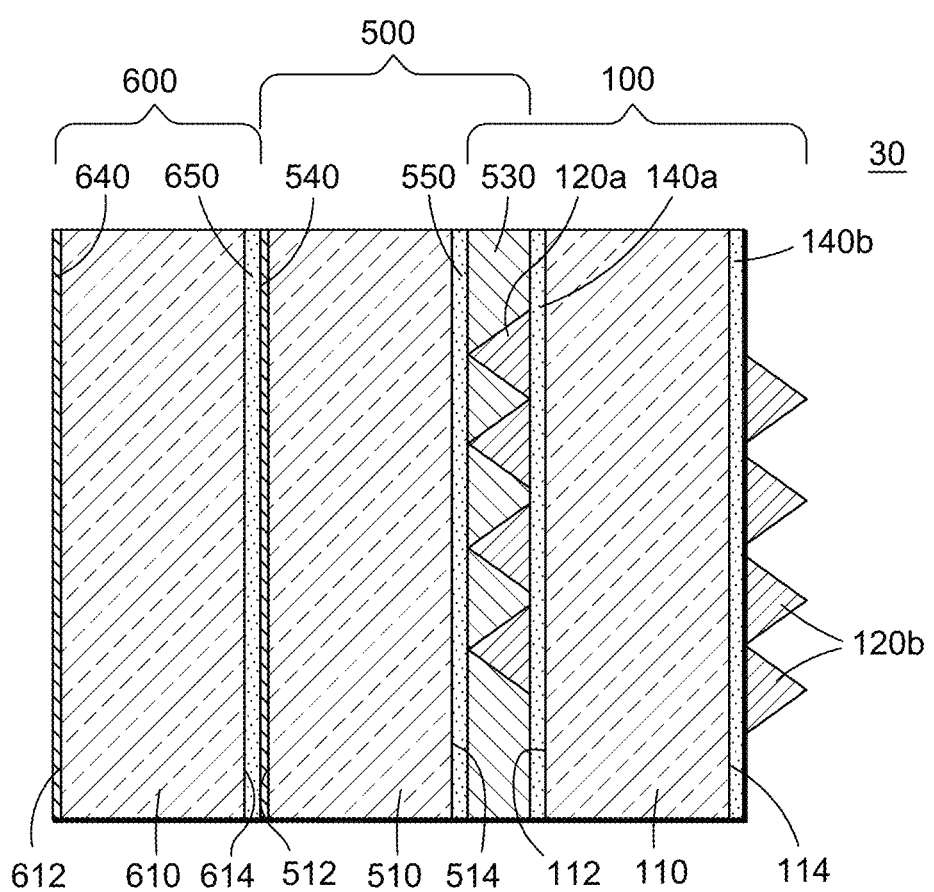
FIG. 6 is a cross-sectional view of the removable lens stack having the layers of FIG. 5.

Referring to FIG. 5, a cross-sectional view is shown of the same base layer 100 as in FIG. 1 but this time with a removable lens layer 500 and a removable lens layer 600, which may be stacked together to form a removable lens stack 30 as shown in cross-section in FIG. 6. The base layer 100 of the removable lens stack 30 may be the same as that of the removable lens stack 10 as shown in FIGS. 1 and 2 and may similarly be affixed to a surface such as a goggle lens or visor or a transparent window of a surgical helmet, hood, or gown, for example, or alternatively may be attached at a perimeter thereof to a frame such that the removable lens stack 30 itself serves as the lens, visor, face shield, etc. Like the removable lens stack 20, the removable lens stack 30 advantageously may employ moth eye coating in some but not all layers, reducing the difficulty and expense associated with producing moth eye coating. In the illustrated embodiment, for example, the base layer 100 is the only layer to have moth eye coating, with removable lens layers 500, 600 instead having an acrylic or fluoropolymer coating 540, 640 (e.g., a hard coat) that may be less expensive to produce than a moth eye coating, such as by spin coating, dip coating, or vacuum deposition. In particular, a first removable lens layer 500 may include a substrate 510, an acrylic or fluoropolymer coating 540 (e.g., a hard coat) on a first side 512 of the substrate 510, and a fluoropolymer coating 530 on a second side 514 of the substrate 510 opposite the first side 512 (with optional adhesion treatment 550). With the first removable lens layer 500 stacked on top of the base layer 100 and the second side 514 of the substrate 510 facing the first side 112 of the substrate 110 of the base layer 100, the fluoropolymer coating 530 may be molded to fit the moth eye coating 120a as described above.

One or more additional removable lens layers 600 may also be added to the stack, each including a substrate 610, an acrylic or fluoropolymer coating 640 (e.g., a hard coat) on a first side 612, and an adhesive 650 such as an acrylic or polyurethane adhesive on a second side 614. One such removable lens layer 600 may be stacked on the removable lens layer 500 such that the second side 614 of the substrate 610 faces the first side 512 of the substrate 500. While not specifically illustrated, further removable lens layers 600 may be stacked thereon, with the second side 614 of each substrate 610 facing the first side 612 of each preceding substrate 600. By using an acrylic or fluoropolymer coating 540, 640 (which does not have bumps like the moth eye coating 120a) in place of a conventional anti-reflective coating, any concern about the adhesive 650 filling in around the bumps and undesirably increasing the peel strength can be avoided. As a result, various kinds of adhesive 650 may be used including an acrylic or polyurethane adhesive such as a pressure sensitive adhesive (PSA), which may adhere (e.g., with the application of pressure) to the acrylic or fluoropolymer coating 540, 640 (e.g., hard coat) of the preceding layer 500, 600. The hybrid removable lens stack 30 may effectively achieve the superior antireflective properties of moth eye by incorporating it in one or more layers while at the same time benefiting from one or more layers having less expensive coatings 540, 640 and/or adhesives 550, with the coatings 540, 640 in some cases serving a dual purpose of providing adequate antireflective properties as well as hard coat functionality.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A removable lens stack comprising:
   a base layer including a substrate having a first side and a second side opposite the first side; and
   one or more removable lens layers, each removable lens layer including a substrate having a first side and a second side opposite the first side, each removable lens layer further including a silicone coating on the second side of the substrate, the one or more removable lens layers being stacked on top of the base layer such that the second side of the substrate of each removable lens layer faces the first side of the substrate of the immediately preceding layer.

2. The removable lens stack of claim 1, wherein, in each of the one or more removable lens layers, a refractive index of the silicone coating is within 0.2 of a refractive index of the substrate.

3. The removable lens stack of claim 1, wherein, in each of the one or more removable lens layers and the base layer, the substrate comprises polyethylene terephthalate (PET).

4. The removable lens stack of claim 1, wherein, in each of the one or more removable lens layers and the base layer, the substrate is 1 to 10 mil thick.

5. The removable lens stack of claim 1, wherein the one or more removable lens layers comprises at least two removable lens layers.

6. The removable lens stack of claim 5, wherein the thickness of the substrate is the same in each of the at least two removable lens layers.

7. The removable lens stack of claim 1, wherein the substrate in the base layer is thicker than the substrate in each of the one or more removable lens layers.

8. The removable lens stack of claim 7, wherein, in each of the one or more removable lens layers, the substrate is 2 mil thick.

9. A removable lens stack comprising:
   a base layer including a substrate having a first side and a second side opposite the first side;
   a first removable lens layer including a substrate having a first side and a second side opposite the first side, the first removable lens layer further including a silicone coating on the second side of the substrate and being stacked on top of the base layer such that the second side of the substrate of the first removable lens layer faces the first side of the substrate of the base layer; and
   a second removable lens layer including a substrate having a first side and a second side opposite the first side, the second removable lens layer further including a silicone coating on the second side of the substrate and being stacked on top of the base layer such that the second side of the substrate of the second removable lens layer faces the first side of the substrate of the first removable lens layer.

10. The removable lens stack of claim 9, wherein, in each of the first and second removable lens layers, a refractive index of the silicone coating is within 0.2 of a refractive index of the substrate.

11. The removable lens stack of claim 9, wherein, in each of the first and second removable lens layers and the base layer, the substrate comprises polyethylene terephthalate (PET).

12. The removable lens stack of claim 9, wherein, in each of the first and second removable lens layers and the base layer, the substrate is 1 to 10 mil thick.

13. The removable lens stack of claim 9, wherein the thickness of the substrate is the same in each of the first and second removable lens layers.

14. The removable lens stack of claim 9, wherein the substrate in the base layer is thicker than the substrate in each of the first and second removable lens layers.

15. The removable lens stack of claim 14, wherein, in each of the first and second removable lens layers, the substrate is 2 mil thick.

16. A method of manufacturing a removable lens stack, the method comprising:
   providing a base layer including a substrate having a first side and a second side opposite the first side; and
   stacking one or more removable lens layers on the base layer, each removable lens layer including a substrate having a first side and a second side opposite the first side, each removable lens layer further including a silicone coating on the second side of the substrate, the one or more removable lens layers being stacked on top of the base layer such that the second side of the substrate of each removable lens layer faces the first side of the substrate of the immediately preceding layer.

17. The method of claim 16, wherein, in each of the one or more removable lens layers, a refractive index of the silicone coating is within 0.2 of a refractive index of the substrate.

18. The method of claim 16, wherein, in each of the one or more removable lens layers and the base layer, the substrate comprises polyethylene terephthalate (PET).

19. The method of claim 16, wherein the one or more removable lens layers comprises at least two removable lens layers.

20. The method of claim 16, further comprising laminating the stacked one or more removable lens layers to the base layer under pressure at a temperature less than 40° C.

* * * * *